US012726758B2

(12) United States Patent
Cao et al.

(10) Patent No.: US 12,726,758 B2
(45) Date of Patent: Sep. 1, 2026

(54) SPEAKER CONTROL METHOD AND DEVICE, TERMINAL EQUIPMENT AND COMPUTER-READABLE STORAGE MEDIUM

(71) Applicant: AAC Technologies (Nanjing) Co., Ltd., Nanjing (CN)

(72) Inventors: Nan Cao, Nanjing (CN); Lijian Ye, Nanjing (CN); Hongxing Wang, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 443 days.

(21) Appl. No.: 18/327,013

(22) Filed: May 31, 2023

(65) Prior Publication Data

US 2024/0214722 A1 Jun. 27, 2024

Related U.S. Application Data

(63) Continuation of application No. PCT/CN2023/087232, filed on Apr. 10, 2023.

(30) Foreign Application Priority Data

Dec. 21, 2022 (CN) ......................... 202211649358.8

(51) Int. Cl.

| | |
|---|---|
| ***H04R 1/32*** | (2006.01) |
| ***G10K 11/178*** | (2006.01) |
| ***H04R 3/12*** | (2006.01) |

(52) U.S. Cl.

CPC ....... *H04R 1/323* (2013.01); *G10K 11/17857* (2018.01); *H04R 3/12* (2013.01); *H04R 2430/20* (2013.01)

(58) Field of Classification Search

CPC ...... H04R 1/323; H04R 3/12; H04R 2430/20; H04R 1/1083; H04R 2430/21; H04R 25/50; H04R 3/005; G10K 11/17857; G10K 2210/1081; H04S 7/303; H04S 2420/01; G01S 5/20; G01S 3/808; G10L 21/0364; G10L 2021/02166; G10L 21/0208

See application file for complete search history.

(56) References Cited

U.S. PATENT DOCUMENTS

| | | | | |
|---|---|---|---|---|
| 10,638,248 | B1 * | 4/2020 | Dodds | H04S 7/303 |
| 2017/0289677 | A1 * | 10/2017 | Katagiri | H04R 3/005 |
| 2017/0353804 | A1 * | 12/2017 | Homayoun | G10L 21/0364 |
| 2022/0272443 | A1 * | 8/2022 | Katagiri | G10L 21/0208 |
| 2023/0254642 | A1 * | 8/2023 | Smith | H04R 1/406 348/143 |

* cited by examiner

*Primary Examiner* — Angelica M Mckinney
(74) *Attorney, Agent, or Firm* — Wiersch Law Group

(57) ABSTRACT

This application provides a speaker control method and device, terminal equipment and a computer-readable storage medium. The method includes: obtaining a user perception-prohibited area corresponding to a target audio signal while detecting an audio output event, where the target audio signal is output in response to the audio output event; determining a first speaker based on the user perception-prohibited area, and determining a reverse cancelling sound wave corresponding to the target audio signal; generating a first control parameter based on a characteristic attribute of the reverse cancelling sound wave; and controlling the first speaker to output the reverse cancelling sound wave based on the first control parameter.

9 Claims, 5 Drawing Sheets

SPEAKER CONTROL METHOD AND DEVICE, TERMINAL EQUIPMENT AND COMPUTER-READABLE STORAGE MEDIUM

TECHNICAL FIELD

The present application relates to acoustic techniques, and more particularly to a speaker control method and device, terminal equipment, and a computer-readable storage medium.

BACKGROUND

With the rapid development of science and technology, various terminal devices have been extensively used in users' daily life and work. The current terminal devices are usually equipped with a speaker to provide audio output to end users. During the audio output process, the acoustic waves will propagate in all directions and form an acoustic field around the terminal device.

However, there may be some cases in the actual application where the terminal device is only required to output the audio to the target user in a particular orientation, and the open audio output will cause interference to non-target users, or the leakage of the privacy information of the target user.

SUMMARY

An object of the present application is to provide a speaker control method and device, terminal equipment, and a computer-readable storage medium, so as to at least solve the problem in the prior art that the open audio output of the speaker will cause interference to non-target users, or cause the leakage of private information of the target user.

Technical solutions of this application will be specifically described below.

In a first aspect, this application provides a speaker control method applied to terminal equipment, comprising:

obtaining a user perception-prohibited area corresponding to a target audio signal while detecting an audio output event, wherein the target audio signal is an audio signal output in response to the audio output event;

determining a first speaker based on the user perception-prohibited area, and determining a reverse cancelling sound wave corresponding to the target audio signal;

generating a first control parameter based on a characteristic attribute of the reverse cancelling sound wave; and controlling the first speaker to output the reverse cancelling sound wave based on the first control parameter.

In a second aspect, this application provides a speaker control device applied to terminal equipment, comprising:

an acquisition module;

a determining module;

a generation module; and a control module;

wherein the acquisition module is configured to obtain a user perception-prohibited area corresponding to a target audio signal while detecting an audio output event, wherein the target audio signal is an audio signal output in response to the audio output event;

the determining module is configured to determine a first speaker based on the user perception-prohibited area, and determine a reverse canceling sound wave corresponding to the target audio signal;

the generation module is configured to generate a first control parameter based on a characteristic attribute of the reverse cancelling sound wave; and the control module is configured to control the first speaker to output the reverse cancelling sound wave based on the first control parameter.

In a third aspect, this application provides a terminal equipment, comprising:

a memory;

a processor; and a computer program stored in the memory and executable on the processor;

wherein the processor is configured to execute the computer program to implement steps of the speaker control method provided in the first aspect of this application.

In a fourth aspect, this application provides a computer-readable storage medium, wherein a computer program is stored on the computer-readable storage medium; and the computer program is configured to be executed by a processor to implement steps of the speaker control method provided in the first aspect of this application.

Regarding the speaker control method and device, terminal equipment, and a computer-readable storage medium provided by embodiments of this application, a user perception-prohibited area corresponding to a target audio signal is obtained while detecting an audio output event; a first speaker is determined according to the user perception-prohibited area, and a reverse cancelling sound wave corresponding to the target audio signal is determined; a first control parameter is generated according to the characteristic attribute of the reverse cancelling sound wave; and the first speaker is controlled to output the reverse cancelling sound wave according to the first control parameter. By determining the user perception-prohibited area corresponding to a target audio signal, and controlling the speaker in a corresponding direction of the terminal to output a reverse cancelling sound wave to perform acoustic-filed cancellation for the user perception-prohibited area, the directionality of the audio output at the terminal is enhanced, avoiding the leakage of user's private information or sound interference.

DETAILED DESCRIPTION OF THE EMBODIMENTS

The present application will be described clearly and completely below with reference to the accompanying drawings and embodiments to make objects, technical solutions, and advantages of the present application clearer and better understood. It should be understood that provided below are merely some embodiments of the present application, which are not intended to limit the present application. Other embodiments obtained by those skilled in the art based on the embodiments disclosed herein without making creative effort shall fall within the scope of the present application.

It should be noted that as used herein, terms “first” and “second” are merely descriptive, and are not to be construed as indicating or implying relative importance or implicitly specifying the number of technical features indicated. Thus, the features defined with “first” and “second” may explicitly or implicitly include one or more such features. As used herein, “a plurality of” means two or more, unless otherwise expressly specified.

Figure 1:
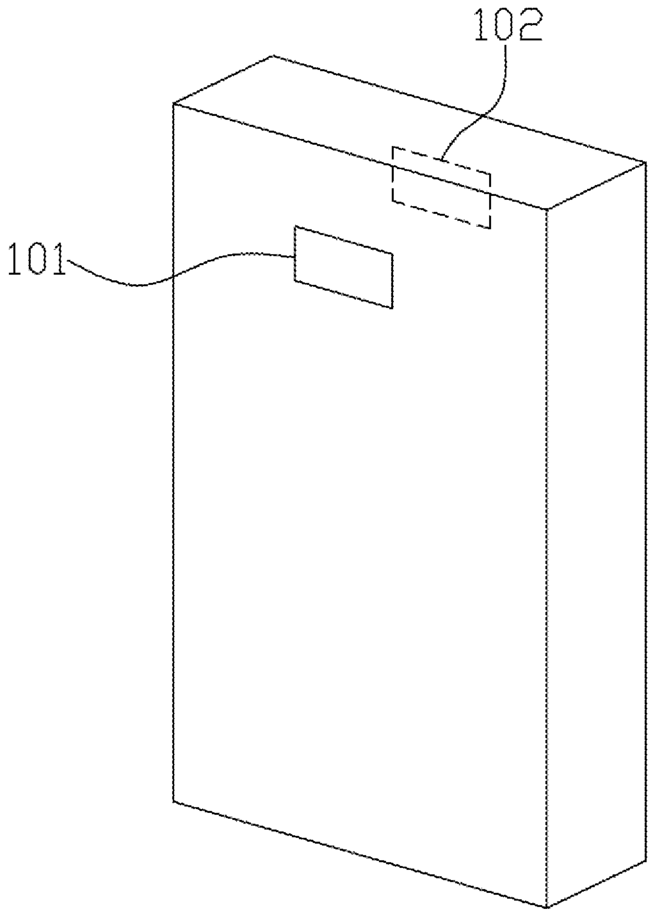
FIG. 1 schematically illustrates a structure of terminal equipment provided in a first embodiment of this application.

In order to solve the problem in the prior art that the open audio output from the speaker will cause interference to the non-target user or leakage of the privacy information of the target user, the first embodiment of the present application provides a speaker control method applied to terminal equipment. The terminal equipment may be provided with a plurality of speakers, and may include, but is not limited to, a smartphone, a tablet computer, a laptop computer, and a desktop computer. The plurality of speakers can preferably be provided on different planes of the terminal. Terminal equipment provided by this embodiment is structurally shown in FIG. 1. Typically, the terminal equipment is a dual-screen phone whose front and back sides are respectively provided with a speaker. As shown in FIG. 1, labels 101 and 102 represent two speakers respectively provided on the front and back of the dual-screen phone.

Figure 2:
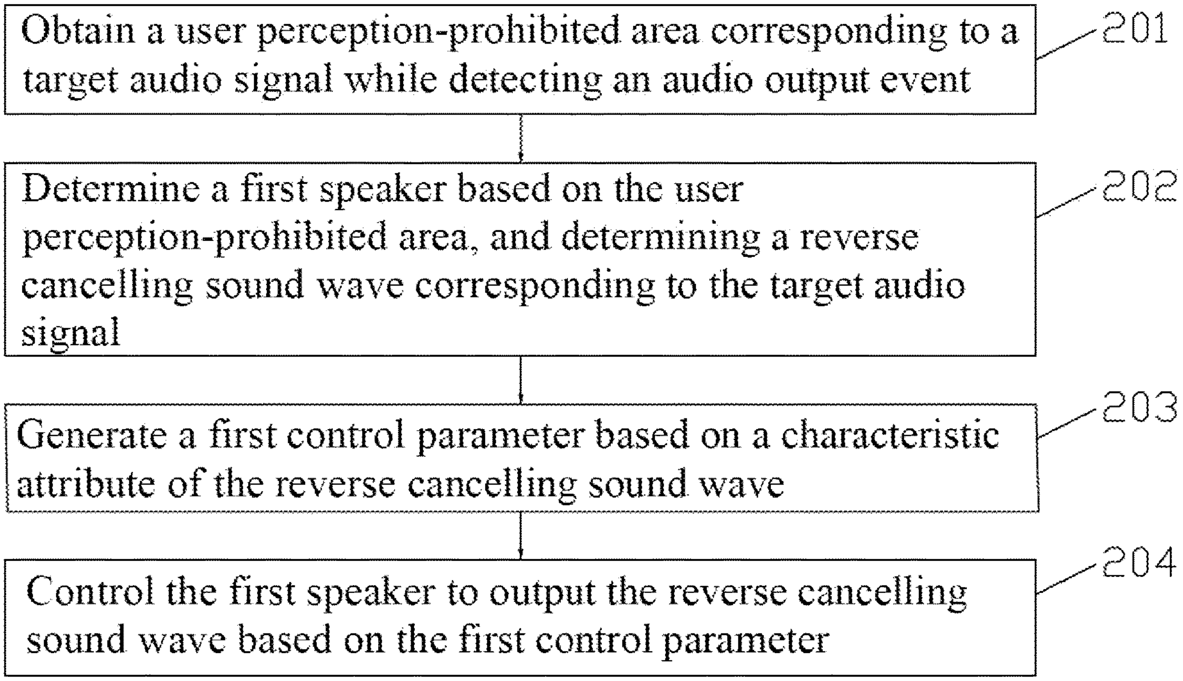
FIG. 2 is a flow chart of a basic speaker control method provided in the first embodiment of this application.

FIG. 2 is a basic flow chart of a speaker control method provided in this embodiment, which includes the following steps.

Step (201) A user perception-prohibited area corresponding to a target audio signal is obtained when an audio output event is detected.

Specifically, the audio output event of this embodiment may include, but is not limited to, a voice listening event, a voice notification event, and an in-app sound trigger event. The terminal equipment outputs the target audio signal in response to the audio output event while detecting the audio output event.

In view of the arrangement of multiple speakers on the terminal equipment, in the relevant art, the target audio signal is usually output by the multiple speakers at the same time. This embodiment is different from the prior art. Specifically, in this embodiment, the entire propagation area in the vicinity of the terminal equipment when the target audio signal is output is divided into a user perception-allowed area (i.e., the area in which the audio perception is allowed) and a user perception-prohibited area (i.e., the area in which the audio perception is prohibited), where the user perception-allowed area is the user area to which the target audio signal needs to be effectively transmitted, and the user perception-prohibited area is defined by the remaining area in the space around the terminal equipment other than the user perception-allowed area. For users in the user perception-prohibited area, the target audio signal needs to be blocked. It is worth noting that in this embodiment, the user perception-allowed area and the user perception-prohibited area may be fixed or regulated flexibly according to the application scenario of the terminal equipment, and thus are not specifically limited herein.

In this embodiment, taking the dual-screen phone in FIG. 1 as an example, in the case that the end user inputs a voice answering event through the front screen when receiving a call reminder, the speaker of the front screen is the target speaker for the end user to listen to the voice, and the spatial area defined by the acoustic output direction of the speaker is the user perception-allowed area and the spatial area towards the back screen of the dual-screen phone is the user perception-prohibited area.

In some embodiments, the speaker control method further includes the following steps before the obtaining of the user perception area-prohibited:

- obtaining an event type of the audio output event; and
- determining whether the event type satisfies a preset sound-field control condition; if yes, triggering the execution of the step of obtaining the user perception-prohibited area corresponding to the target audio signal; otherwise, controlling the plurality of speakers to output the target audio signal simultaneously.

Specifically, in practical applications, not all audio output scenarios of the terminal device require sound field cancellation, for example, in the music playback scenario, it is usually required to ensure that all users around the terminal equipment can perceive the audio played by the terminal equipment. In this regard, in this embodiment, after detecting the audio output event, it is required to determine whether the type of the audio output event meets the preset sound-field control condition, that is, to determine whether the sound-field cancellation is required in the current scenario, for example, to determine whether the current audio output event belongs to WeChat voice message playback event and game sound playback event. If the current audio output event requires the sound-field cancellation, the step (201) of this embodiment is triggered; otherwise, it is determined that the current scenario is an open audio output scenario, and it is feasible to control the multiple speakers of the terminal equipment to simultaneously output the target audio signal.

Step (202) A first speaker is determined according to the user perception-prohibited area, and a reverse cancelling sound wave corresponding to the target audio signal is determined as well.

Specifically, in this embodiment, the speaker whose acoustic wave output area corresponds to the user perception-prohibited area may be identified as the first speaker, and it should be understood that the number of the first speaker is at least one. In addition, the sound field in which the target audio signal propagates to the user perception-prohibited area may be used as a primary sound field, and based on determining the reverse cancelling sound wave having equal amplitude and opposite phase relative to the target audio signal, the secondary sound field generated by the reverse cancelling sound wave is used to cancel the primary sound field.

In some embodiments, the step of determining the reverse cancelling sound wave corresponding to the target audio signal includes:

- controlling a microphone corresponding to the first speaker to collect a first actual audio signal corresponding to the target audio signal; and
- determining the reverse cancelling sound wave according to the first actual audio signal.

Specifically, sound waves will experience a certain attenuation during the spatial propagation in the practical application. Generally, the speaker is correspondingly arranged on the terminal equipment with respect to the microphone. In this embodiment, in order to improve the accuracy of the determined reverse cancelling sound wave, the microphone corresponding to the first speaker can be used to collect the actual audio signal propagating to the space area corresponding to the target audio signal, and then the reverse cancelling sound wave is determined based on actual audio signal.

Step (203) A first control parameter is generated based on a characteristic attribute of the reverse cancelling sound wave.

Specifically, this embodiment can generate the first control parameter based on the phase and amplitude of the reverse cancelling sound wave. In practice, this embodiment can combine the characteristic attributes of the reverse cancelling sound wave with the first speaker's characteristic parameter to generate the first control parameter, and it should be understood that the speaker's characteristic parameter may include, but is not limited to, structural physical parameters, acoustic parameters, and sound-field performance indicator. Moreover, this embodiment can also combine the characteristic attributes of the reverse cancelling sound wave, the type of the audio output event and the characteristic parameter of the first speaker to generate the first control parameter.

Step (204) The first speaker is controlled to output the reverse cancelling sound wave according to the first control parameter.

Specifically, the first speaker of this embodiment outputs the reverse cancelling sound wave to the user perception-prohibited area while other speakers output the target audio signal, and the target audio signal transmitted to the user perception-prohibited area is superimposed with the reverse cancelling sound wave to achieve the local sound elimination, thereby preventing the leakage of terminal output audio (namely, enabling the private audio output) and the interference of the terminal output audio to unrelated users near the terminal equipment.

In some embodiments, the step of obtaining a user perception-prohibited area corresponding to the target audio signal is preceded by:

- obtaining a user perception-allowed area corresponding to the target audio signal;
- determining a second speaker according to the user perception-allowed area, and generating a second control parameter according to the audio output event; and
- controlling the second speaker to output the target audio signal associated with the audio output event based on the second control parameter.

Specifically, in this embodiment, the second speaker that outputs the target audio signal to the user perception-allowed area is controlled to output the target audio signal according to the second control parameter, so as to optimize the sound field of the user perception-allowed area and improve the auditory experience of the user.

Notably, in this embodiment, the number of the second speaker is at least one, and the optimization of the sound field of the user perception-allowed area may be enhanced optimization or weakened optimization, and overall optimization or frequency band-based optimization. Moreover, the second control parameter includes, but is not limited to, amplitude, phase, and signal delay.

It should also be noted that the first control parameter and the second control parameter both can be time-varying, linear or nonlinear, and the two control parameters can control two different speakers, respectively. Certainly, in practice, the first speaker and the second speaker are not limited to two different speakers, and can also be the same speaker. In this case, it is simply required to adopt the first control parameter and the second parameter to alternately control the speaker, that is, the same speaker is simultaneously involved in the sound-field optimization of the user perception-allowed area and the sound-field cancellation of the user perception-prohibited area.

In some embodiments, the step of obtaining a user perception-allowed area corresponding to the target audio signal includes:

- acquiring a use state of the terminal equipment;
- determining a relative position relationship between an end user and the terminal equipment based on the use state; and
- determining the user perception-allowed area corresponding to the target audio signal based on the relative position relationship.

Specifically, in this embodiment, the relative position relationship between the end user and the terminal equipment can be determined based on the use state of the terminal equipment when receiving the audio output event, and based on the relative position relationship, the user perception-allowed area corresponding to the audio signal to be output is determined. Taking the dual-screen phone as an example, when the end user inputs the audio output event through the display on one side, it can determine whether the phone is currently in a front-screen use state or a back-screen use state by gravity sensing or according to the capacitive detection of the display, and then the corresponding spatial area where the end user is located can be determined as the user perception-allowed area.

In some embodiments, the step of generating a second control parameter based on the audio output event includes:

- obtaining a type of the audio output event; and
- generating the second control parameter according to the type of the audio output event.

In addition, in this embodiment, the second control parameter can be generated based on the combination of the event type and the characteristic parameter of the second speaker, where the characteristic parameter includes, but is not limited to, structural physical parameters, acoustic parameters, and sound-field performance indicator.

In some embodiments, after the step of controlling the first speaker to output the reverse cancelling sound wave according to the first control parameter, the speaker control method further includes:

- controlling the microphone to collect a second actual audio signal generated from superposition of the reverse cancelling sound wave and the target audio signal;
- comparing the second actual audio signal with a standard audio signal; and
- when the second actual audio signal is not identical to the standard audio signal, adjusting the first control parameter according to a difference index between the second actual audio signal and the standard audio signal; and controlling the first speaker to output the reverse cancelling sound wave according to an adjusted first control parameter.

Specifically, this embodiment can also conduct real-time detection of the sound field cancellation effect for the user perception-prohibited area. If the actual audio signal collected by the microphone is not identical to the standard audio signal in the sound field cancellation scenario, it indicates that the sound field cancellation effect is poor. This embodiment further triggers a feedback adjustment mechanism, in which the difference index between the actual audio signal and the standard audio signal is adopted to adaptively adjust the first control parameter used in the previous sound field cancellation, so as to improve the sound field cancellation effect.

Compared to the relevant art, the speaker control method provided herein includes: obtaining a user perception-prohibited area corresponding to a target audio signal when an audio output event is detected; determining a first speaker based on the user perception-prohibited area, and determining a reverse cancelling sound wave corresponding to the target audio signal; generating a first control parameter based on a characteristic attribute of the reverse cancelling sound wave; and controlling the first speaker to output the reverse cancelling sound wave according to the first control parameter. Through the implementation of this application, the user perception-prohibited area corresponding to the audio signal to be output by the terminal device is determined; the speaker in the corresponding orientation of the terminal device is controlled to output the reverse cancelling sound wave to cancel the sound field of the user perception-prohibited area, improving the directionality of the terminal audio output and avoiding the leakage of the private information of the end user or the interference to unrelated users.

Figure 3:
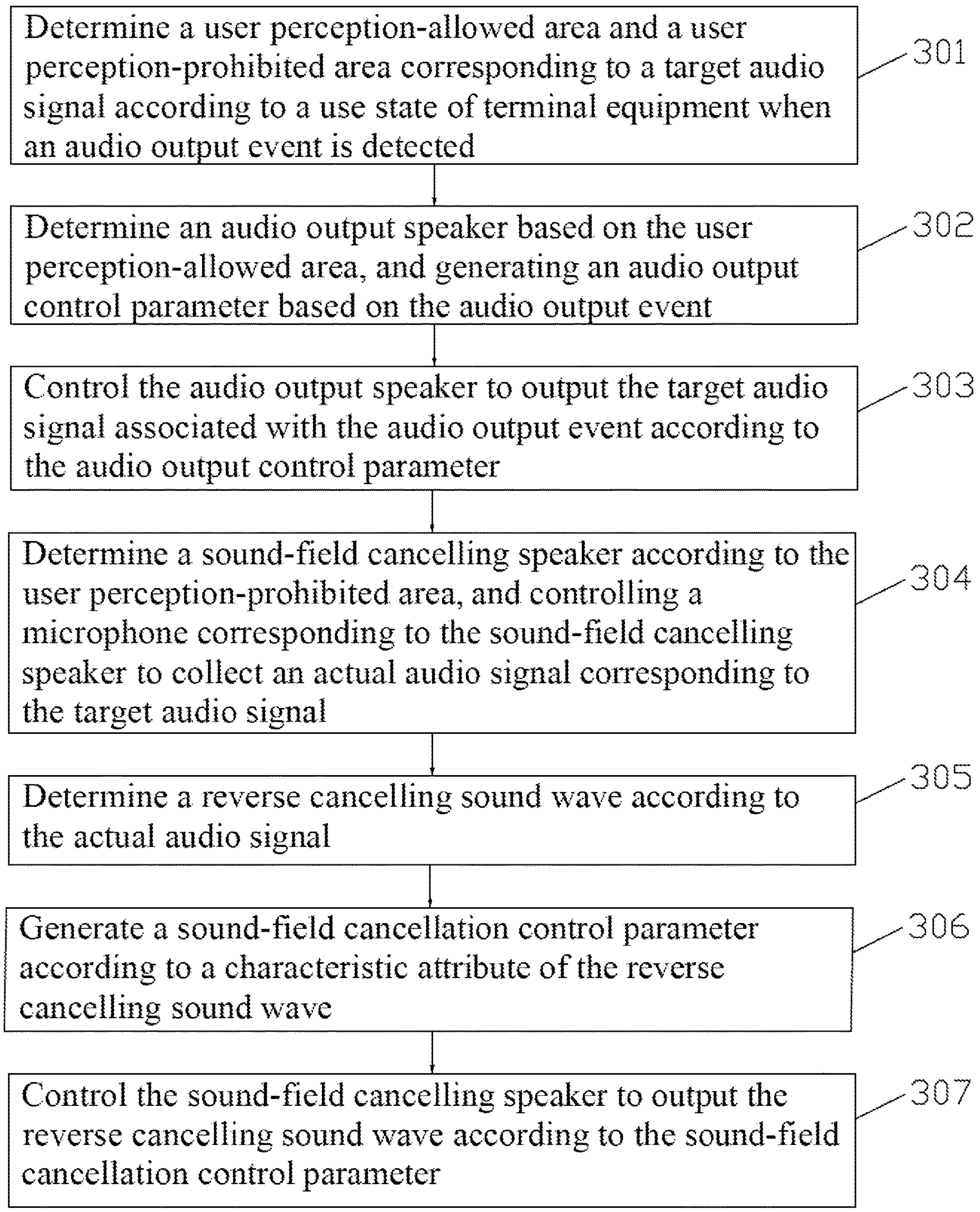
FIG. 3 is a flow chart of a detailed speaker control method provided in a second embodiment of this application.

For better understanding of the present application, the second embodiment of the present application further provides a detailed speaker control method (as shown in FIG. 3), which includes the following steps.

Step (301) A user perception-allowed area and a user perception-prohibited area corresponding to a target audio signal are determined according to a use state of terminal equipment when an audio output event is detected.

In this embodiment, the terminal equipment may be a dual-screen phone including a front-screen use state and a back-screen use state; the user perception-allowed can be interpreted as an area where the user is allowed to effectively perceive the target audio signal, and the user perception-prohibited area can be interpreted as an area where the target audio signal needs to be cancelled.

Step (302) An audio output speaker is determined based on the user perception-allowed area, and an audio output control parameter is generated based on the audio output event.

Step (303) The audio output speaker is controlled to output the target audio signal associated with the audio output event according to the audio output control parameter.

Specifically, in this embodiment, the sound field of the user perception-allowed area is optimized according to the audio output control parameter, so as to improve the auditory experience of the user in the audio perception-allowed area. The optimization includes enhancement optimization and attenuation optimization, and can be performed in terms of amplitude, phase and signal delay.

Step (304) A sound-field cancelling speaker is determined according to the user perception-prohibited area, and a microphone corresponding to the sound-field cancelling speaker is controlled to collect an actual audio signal corresponding to the target audio signal.

Step (305) A reverse cancelling sound wave is determined according to the actual audio signal.

Specifically, in this embodiment, a microphone is employed to collect the audio signal corresponding to the target audio signal actually propagated to the spatial area requiring the sound-field cancellation, and then the reverse cancelling sound wave is determined according to the actual audio signal.

Step (306) A sound-field cancellation control parameter is generated according to a characteristic attribute of the reverse cancelling sound wave.

Step (307) The sound-field cancelling speaker is controlled to output the reverse cancelling sound wave according to the sound-field cancellation control parameter.

Specifically, the sound-field cancelling speaker of this embodiment outputs the reverse cancelling sound wave to the user perception-prohibited area while the audio output speaker outputs the target audio signal, and the target audio signal propagating to the user perception-prohibited area is superposed with the reverse cancelling sound wave to achieve the local sound elimination, that is, for users in the audio perception-prohibited area, the target audio signal is blocked, thereby avoiding the leakage of the terminal output audio, and avoiding the interference to the irrelevant users near the terminal equipment.

It should be understood that the serial numbers of the steps in this embodiment does not imply the actual execution sequence, and the execution sequence should be determined by their functions and inherent logic relationships. Therefore, the implementation of the method provided herein is not limited to the above sequence.

Figure 4:
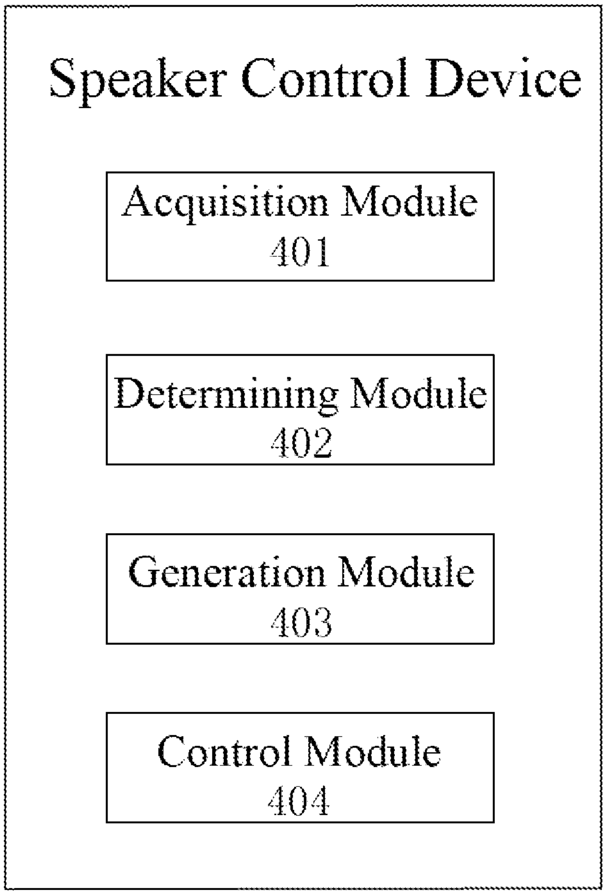
FIG. 4 is a block diagram of a speaker control device provided in a third embodiment of this application.

The third embodiment of this application provides a speaker control device (as shown in FIG. 4) for implementing the above-mentioned speaker control method, mainly including:

an acquisition module 401, configured to acquire a user perception-prohibited area corresponding to a target audio signal when detecting an audio output event, where the target audio signal is an audio signal output in response to the audio output event;

a determining module 402, configured to determine a first speaker according to the user perception-prohibited area, and determine a reverse cancelling sound wave corresponding to the target audio signal;

a generation module 403, configured to generate a first control parameter according to a characteristic attribute of the reverse cancelling sound wave; and a control module 404, configured to control the first speaker to output the reverse cancelling sound wave according to the first control parameter.

In an optional implementation of this embodiment, the acquisition module 401 is also configured to acquire a user perception-allowed area corresponding to target audio signal; the determining module 402 is further configured to determine a second speaker according to the user perception-allowed area; the generation module 403 is further configured to generate a second control parameter according to the audio output event; and the control module 404 is further configured to control the second speaker to output the target audio signal associated with the audio output event based on the second control parameter.

In an optional implementation of this embodiment, with regard to the acquisition module 401, the user perception-allowed area corresponding to the target audio signal is acquired through steps of:

acquiring a use state of terminal equipment;

determining a relative position relationship between an end user and the terminal equipment; and determining the user perception-allowed area corresponding to the target audio signal according to the relative position relationship.

In an optional implementation of this embodiment, with regard to the generation module 403, the second control parameter is generated according to the audio output event through steps of:

obtaining a type of the audio output event; and generating the second control parameter according to the type of the audio output event.

In an optional implementation of this embodiment, the acquisition module 401 is configured to perform:

obtaining a type of the audio output event; and determining whether the type of the audio output event satisfies a preset sound-field control condition; if yes, obtaining the user perception-prohibited area corresponding to the target audio signal;

the control module 404 is further configured to control a plurality of speakers to simultaneously the target audio signal when the type of the audio output event does not satisfy the preset sound-field control condition.

In an optional implementation of this embodiment, with regard to the determining module 402, the reverse cancelling sound wave corresponding to the target audio signal is determined through steps of:

controlling a microphone corresponding to the first speaker to collect a first actual audio signal corresponding to the target audio signal; and determining the reverse cancelling sound wave according to the first actual audio signal.

In an optional implementation of this embodiment, the control module 404 is further configured to perform:

controlling the microphone to collect a second actual audio signal generated from superposition of the reverse cancelling sound wave with the target audio signal;

comparing the second actual audio signal with a standard audio signal;

when the second actual audio signal is not identical to the standard audio signal, adjusting the first control parameter according to a difference index between the second actual audio signal and the standard audio signal; and controlling the first speaker to output the reverse cancelling sound wave according to an adjusted first control parameter.

It should be noted that the speaker control methods provided in the first and second embodiments can be implemented based on the speaker control device provided in this embodiment. It should be understood by those skilled in the art that for the convenience of description, the specific operation process of the speaker control device will not be repeated here, and reference can be made to the preceding method embodiments.

Compared to the relevant art, the speaker control device provided herein is configured to acquire a user perception-prohibited area corresponding to the target audio signal when detecting an audio output event; determine a first speaker according to the user perception-prohibited area, and determine a reverse cancelling sound wave corresponding to the target audio signal; generate a first control parameter according to a characteristic attribute of the reverse cancelling sound wave; and control the first speaker to output the reverse cancelling sound wave according to the first control parameter. Through the implementation of this application, the user perception-prohibited area corresponding to the audio signal to be output by the terminal device is determined; and the speaker in the corresponding orientation of the terminal device is controlled to output the reverse cancelling sound wave to cancel the sound field of the user perception-prohibited area, improving the directionality of the terminal audio output and avoiding the leakage of the private information of the end user or the interference to unrelated users.

Figure 5:
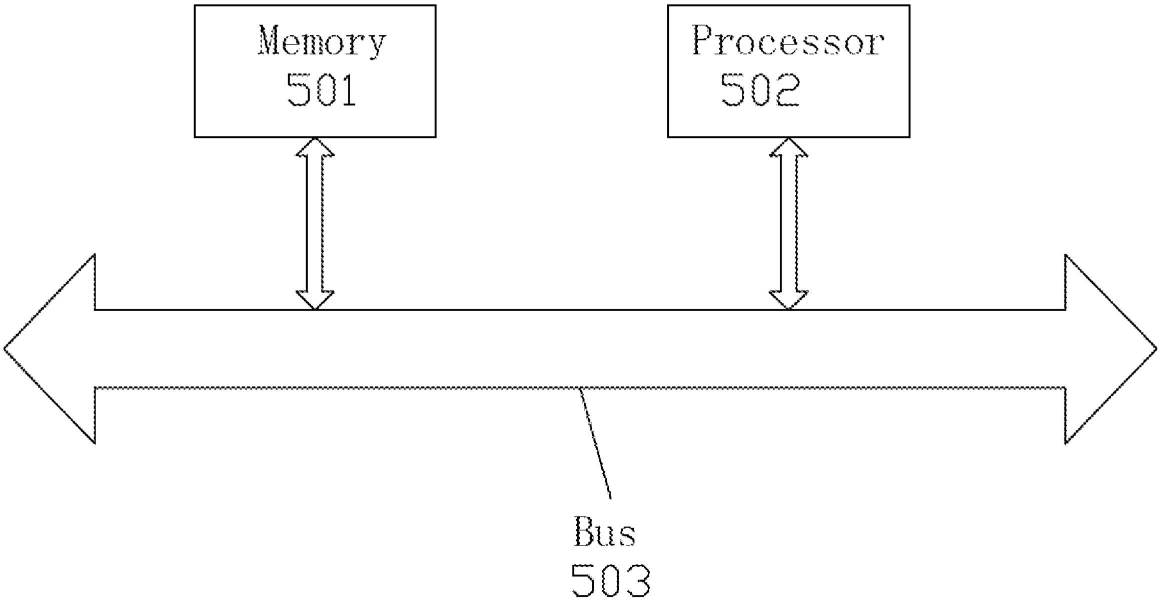
FIG. 5 schematically shows a structure of terminal equipment provided in a fourth embodiment of this application.

Referring to FIG. 5, the fourth embodiment of this application provides terminal equipment, which can be used to implement the speaker control method provided in the preceding embodiments.

The terminal equipment includes a memory 501, a processor 502, a bus 503, and a computer program stored on the memory 501 and executable on the processor 502. The memory 501 is connected to the processor 502 via the bus 503. The processor 502 is configured to execute the computer program to implement the speaker control method provided in the preceding embodiments, where the number of the processor 502 may be one or more.

The memory 501 may be a random-access memory (RAM) or a non-volatile memory, such as a disk memory. The memory 501 is configured to store an executable program code, and is coupled to the processor 502.

Further, an embodiment of this application also provides a computer-readable storage medium, which may be provided in the terminal equipment in each of the above embodiments. Optionally, the computer-readable storage medium may be the memory in the embodiment shown in FIG. 5.

The computer-readable storage medium has a computer program stored thereon, and the computer program is configured to be executed by a processor to implement the speaker control method in the preceding embodiments. Further, the computer-readable storage medium may also be a USB flash disk, a read-only memory (ROM), a random-access memory (RAM), a disk, a CD-ROM or other mediums that can store the program code.

Regarding the several embodiments provided herein, it should be understood that the disclosed device and method can also be implemented in other ways. For example, the above-mentioned device embodiment is merely exemplary, e.g., the module division is achieved merely based on logical function, and can be conducted in another way in the actual implementation; e.g., multiple modules or components can be combined, or integrated into another system, or some features may be ignored, or not implemented. Moreover, the mutual coupling, direct coupling or communication connection may be achieved through some interfaces, and the indirect coupling or communication connection between the components or modules may be electrical, mechanical, or other forms.

The modules illustrated as separate components may or may not be physically separated, and the components displayed as modules may or may not be physical modules, i.e., they may be located in one place or may be distributed to multiple network modules. These modules can be partially or completely selected according to practical needs to implement the technical solutions of the present embodiment.

In addition, individual functional modules in each embodiment of the present application can be integrated in a single processing module, or can be physically present separately, or two or more modules can be integrated in a single module. Such integrated modules can be in the form of hardware or a functional software module.

The integrated module, when implemented as a software functional module and sold or used as a stand-alone product may be stored in a computer-readable storage medium. It is understood that the technical solution of the present application, or part or all of the technical solution that essentially contributes to the prior art may be embodied in the form of a software product, where the software product is stored in a computer-readable storage medium, and includes several instructions to enable a computer device to implement all or part of the steps of the method disclosed in individual embodiments. The aforementioned computer-readable storage medium includes USB flash disk, removable hard disk, ROM, RAM, disk, CD-ROM, and other mediums that can store a program code.

It should be noted that the preceding method embodiments are all presented as a series of actions for simplified description, but those of ordinary skill in the art should be aware that the present application is not limited by the sequence of actions described above, as some steps of the present application can be performed in other sequences or simultaneously. Moreover, those skilled in the art should also be aware that provided herein are merely preferred embodiments of the present application, and the actions and modules involved are not all necessary for the enablement of the present application.

Individual embodiments of the application have their own focus, and for the part not described in detail in a certain embodiment, reference can be made to other embodiments.

The speaker control method and device, terminal equipment and a computer-readable storage medium of this application have been described above. Described above are only preferred embodiments of the present application, which are not intended to limit the present application. It should be noted that any variations, replacements and modifications made by those of ordinary skill in the art without departing from the spirit and scope of the present application shall fall within the scope of the present application defined by the appended claims.

What is claimed is:

1. A speaker control method applied to a terminal equipment, comprising:

obtaining a user perception-prohibited area corresponding to a target audio signal while detecting an audio output event, wherein the target audio signal is an audio signal output in response to the audio output event;

determining a first speaker based on the user perception-prohibited area, and determining a reverse cancelling sound wave corresponding to the target audio signal;

generating a first control parameter based on a characteristic attribute of the reverse cancelling sound wave; and controlling the first speaker to output the reverse cancelling sound wave based on the first control parameter.

2. The speaker control method of claim 1, wherein before the step of "obtaining the user perception-prohibited area corresponding to the target audio signal", the speaker control method further comprises:

obtaining a user perception-allowed area corresponding to the target audio signal;

determining a second speaker according to the user perception-allowed area, and generating a second control parameter according to the audio output event; and controlling the second speaker to output the target audio signal associated with the audio output event based on the second control parameter.

3. The speaker control method of claim 2, wherein the step of "obtaining the user perception-allowed area corresponding to the target audio signal" comprises:

acquiring a use state of the terminal equipment;

determining a relative position relationship between an end user and the terminal equipment; and determining the user perception-allowed area corresponding to the target audio signal according to the relative position relationship.

4. The speaker control method of claim 2, wherein the step of "generating the second control parameter according to the audio output event" comprises:

obtaining a type of the audio output event; and generating the second control parameter according to the type of the audio output event.

5. The speaker control method of claim 1, wherein before the step of "obtaining the user perception-prohibited area corresponding to the target audio signal", the speaker control method further comprises:

obtaining a type of the audio output event; and determining whether the type satisfies a preset sound-field control condition; if yes, performing the step of "obtaining the user perception-prohibited area corresponding to the target audio signal"; otherwise, controlling a plurality of second speakers to output the target audio signal simultaneously.

6. The speaker control method of claim 1, wherein the step of "determining the reverse cancelling sound wave corresponding to the target audio signal" comprises:

controlling a microphone corresponding to the first speaker to collect a first actual audio signal corresponding to the target audio signal; and determining the reverse cancelling sound wave according to the first actual audio signal.

7. The speaker control method of claim 6, wherein after the step of "determining the reverse cancelling sound wave corresponding to the target audio signal", the speaker control method further comprises:

controlling the microphone to collect a second actual audio signal generated from superposition of the reverse cancelling sound wave and the target audio signal;

comparing the second actual audio signal with a standard audio signal; and when the second actual audio signal is not identical to the standard audio signal, adjusting the first control parameter according to a difference index between the second actual audio signal and the standard audio signal; and controlling the first speaker to output the reverse cancelling sound wave according to an adjusted first control parameter.

8. A terminal equipment, comprising:

a memory;

a processor; and a computer program stored in the memory and executable on the processor;

wherein the processor is configured to execute the computer program to implement the speaker control method of claim 1.

9. A speaker control device applied to a terminal equipment, comprising:

an acquisition module;

a determining module;

a generation module; and a control module;

wherein the acquisition module is configured to obtain a user perception-prohibited area corresponding to a target audio signal while detecting an audio output event, wherein the target audio signal is an audio signal output in response to the audio output event;

the determining module is configured to determine a speaker based on the user perception-prohibited area, and determine a reverse canceling sound wave corresponding to the target audio signal;

the generation module is configured to generate a control parameter based on a characteristic attribute of the reverse cancelling sound wave; and the control module is configured to control the speaker to output the reverse cancelling sound wave based on the control parameter.

* * * * *